Figure 1:
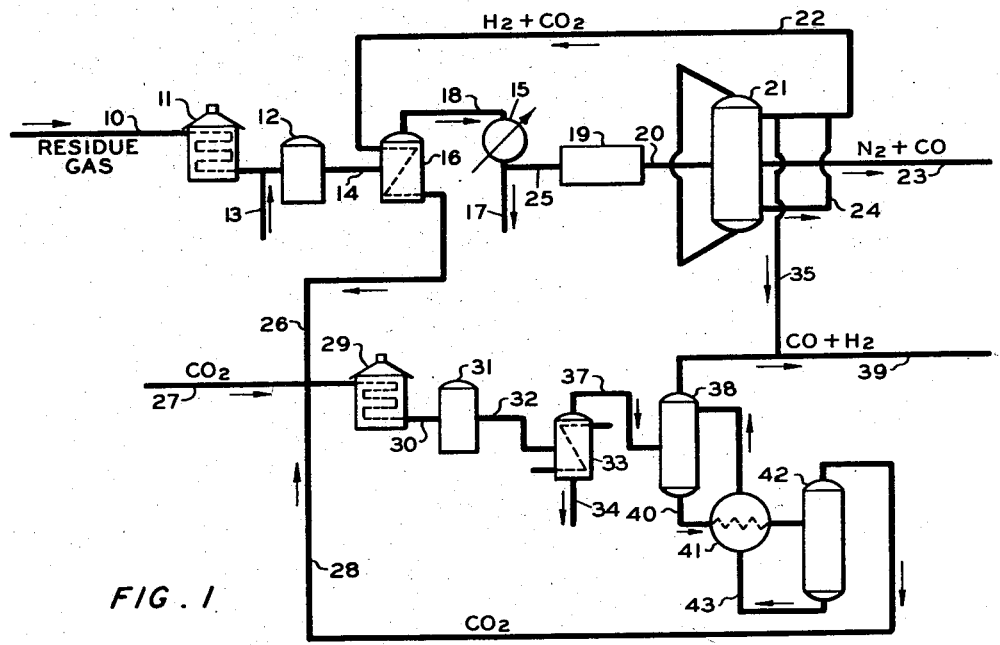

Aug. 14, 1951 P. T. SOWDEN, JR 2,564,236
RECOVERY OF CARBON MONOXIDE AND HYDROGEN
FROM HIGH NITROGEN CONTENT GAS
Filed June 24, 1949

INVENTOR.
P.T. SOWDEN, JR.

BY
Hudson + Young
ATTORNEYS

Patented Aug. 14, 1951

2,564,236

UNITED STATES PATENT OFFICE 2,564,236

RECOVERY OF CARBON MONOXIDE AND HYDROGEN FROM HIGH NITROGEN CONTENT GAS

Parkin T. Sowden, Jr., Bartlesville, Okla., assignor to Phillips Petroleum Company, a corporation of Delaware Application June 24, 1949, Serial No. 101,229

11 Claims. (Cl. 48—197)

This invention relates to the recovery of carbon monoxide and hydrogen from residue gas. In one of its more specific aspects it relates to the recovery of a relatively pure carbon monoxide-hydrogen synthesis gas and nitrogen from a high nitrogen content gas. Another aspect of this invention relates to the recovery of carbon monoxide and hydrogen from tangential burner residue gas which is the off gas from acetylene production.

After hydrocarbon removal, the residue gas from the production of acetylene using tangential burners contains carbon monoxide and hydrogen in a ratio fairly close to 1:2. However, this gas also contains about 75 per cent or more of nitrogen which has previously been used as a diluent in acetylene manufacture. Such a residue gas containing so much nitrogen is only useful as a low B. t. u. fuel. There are large quantities of such gas available from acetylene production and other processes conducted in tangentially fired furnaces and from various refinery gas streams and if an economical process were devised for separating the carbon monoxide and hydrogen from the nitrogen it would be very desirable.

An object of this invention is to recover carbon monoxide and hydrogen from high nitrogen content gas.

Another object of this invention is to separate and recover carbon monoxide and hydrogen from tangential burner residue gas.

Another object is to provide an economical process for the separation and recovery of a mixture of carbon monoxide and hydrogen and also nitrogen from tangential burner residue gas.

Still another object is to recover carbon monoxide and hydrogen from a high nitrogen content gas in a ratio suitable for use in the Fischer-Tropsch synthesis of hydrocarbons.

Further objects and advantages of this invention will be apparent to one skilled in the art from the accompanying disclosure and discussion.

In accordance with one embodiment of my invention a tangential burner residue gas from acetylene manufacture by a process such as that taught in U. S. Patent No. 2,377,245, by J. C. Krejci, issued May 29, 1945, or residue gas from carbon black manufacture, or other residue gas containing a major proportion of nitrogen and minor amounts of carbon monoxide and hydrogen and a small quantity of carbon dioxide, or a gas containing removable quantities of nitrogen is pre-heated to reaction temperature and passed along with steam to a shift converter where it is shifted thus increasing the ratio of hydrogen and changing most of the carbon monoxide to carbon dioxide by means of the water gas shift reaction. The shift product is then passed to an adsorption unit such as charcoal adsorption or silica gel adsorption where it is cut into three fractions. High purity hydrogen is removed as an overhead fraction, nitrogen and a small quantity of carbon monoxide are removed as a middle fraction, and carbon dioxide is recovered as bottoms. The hydrogen and carbon dioxide are recombined and passed to a reverse shift converter along with additional and/or recycle carbon dioxide. By reverse shift converter I mean a reactor in which hydrogen and carbon dioxide are converted to carbon monoxide and water, this reaction being the reverse of that taking place in the shift converter where carbon monoxide and water are converted to hydrogen and carbon dioxide. The additional carbon dioxide may be that which is removed from tangential burner gas prior to recovery of the light hydrocarbons, particularly acetylene when such gas is used as feed, or it may be from an extraneous source. Sufficient carbon dioxide reactant is used in the reverse shift converter to decrease the quantity of hydrogen and increase the quantity of carbon monoxide. Thus, the addition of carbon dioxide at this point controls the ratio of carbon monoxide and hydrogen in the product. The product from this reverse shift reaction is passed to an amine or other carbon dioxide absorption unit where the excess carbon dioxide is removed and a product gas of carbon monoxide and hydrogen containing only a small amount of nitrogen is recovered.

In a second embodiment of my invention, an adsorption unit such as charcoal adsorption or silica gel adsorption is used to separate the product from the first shift converter into only two fractions: one of hydrogen and the other containing carbon dioxide, nitrogen, and carbon monoxide. The composite fraction is then passed to an amine absorption unit to recover the carbon dioxide. The carbon dioxide thus recovered and the hydrogen from the adsorption unit are combined and treated as in the first embodiment to obtain the desired $H_2:CO$ ratio.

It is within the scope of my invention to process the nitrogen-rich fraction which generally contains only small quantities of carbon monoxide and recover the nitrogen therefrom for further use.

Figure 2:
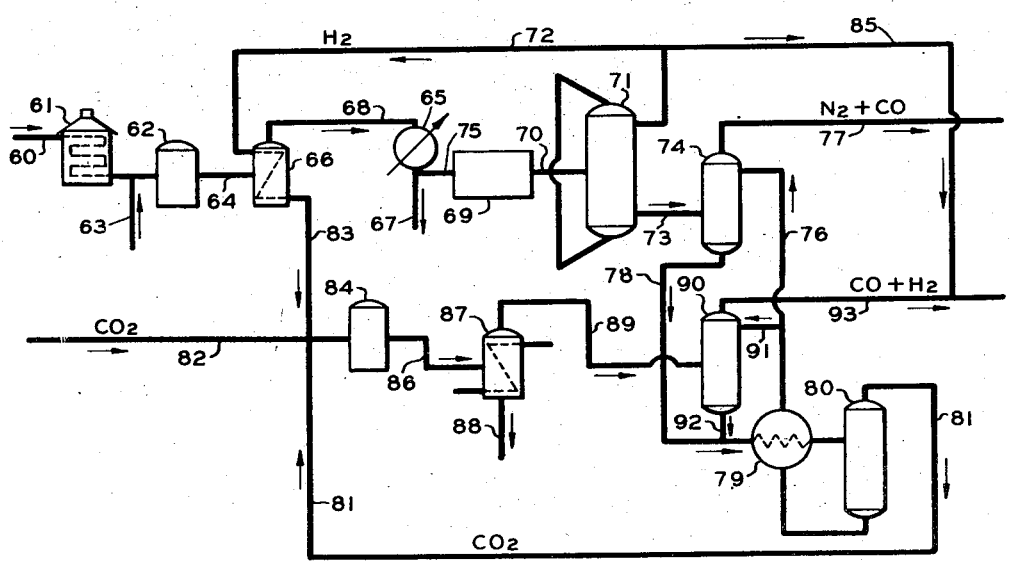

A broader understanding of some of the many aspects of my invention may be had by referring to the attached schematic flow diagrams of two embodiments of my invention. Figure 1 is a flow sheet of the first embodiment discussed above. Figure 2 is a flow sheet of the second embodiment of my invention as discussed above.

Refer now to Figure 1. Residue gas from which the aromatics and other desirable constituents have been removed is passed via line 10 to preheater 11 where it is heated to reaction temperature in the range of 750 to 1000° F. The thus heated gas is passed to shift converter 12 where it contacts a shift catalyst, such as iron oxide or nickel oxide for a period of 2 to 10 seconds at atmospheric to 500 p. s. i. Sufficient steam is added via line 13 to the gas introduced to the converter to change most of the carbon monoxide to carbon dioxide and hydrogen by means of the water gas shift reaction. The shifted gas containing nitrogen, hydrogen, a trace of carbon monoxide, steam, and carbon dioxide is passed via line 14 to cooler 16. The cooled products of the shift converter are passed via line 18 to condenser 15 where steam is condensed and removed therefrom via line 17. The remaining uncondensed material is passed from condenser 15 via line 25 to dryer 19. Suitable material may be used in dryer 19 for removing water vapor from the gas, such as, for example bauxite or silica gel. The dry gas is then passed from dryer 19 via line 20 to moving bed adsorption unit 21 where it is cut into three fractions: an overhead fraction of high purity hydrogen removed via line 22, nitrogen and carbon monoxide removed via line 23, and carbon dioxide removed via line 24 and introduced therethrough to line 22 where it is admixed with the hydrogen removed overhead. A choice of suitable operating conditions for adsorption unit 21 depending on the feed stream, size of the adsorber, flow rates, etc., may be readily selected by one skilled in the art.

The mixture of hydrogen and carbon dioxide in line 22 passes through cooler 16 and from there via line 26 to line 27 where it is admixed with recycle carbon dioxide from line 28 and/or fresh carbon dioxide. The admixture of carbon dioxide and hydrogen is passed from line 27 to preheater 29 where it is brought to reaction temperature which may be in the range of 750 to 1000° F. the gas is then passed via line 30 to reverse shift converter 31 where a portion of the carbon dioxide is shifted to carbon monoxide and the quantity of hydrogen is reduced forming steam with the excess oxygen from the carbon dioxide. A suitable contact time is in the range of 2 to 10 seconds and a suitable pressure may be in the range of atmospheric to 500 p. s. i. The catalyst used in reverse shift converter 31 is similar to that used in shift converter 12. The gas which has been shifted in converter 31 is passed via line 32 through cooling zone 33 where it is cooled to a temperature at which steam is condensed to water. Said water is removed via line 34. The gas is passed to absorption unit 38 via line 37 where it is contacted with such a material as monoethanolamine or high pressure water to remove the carbon dioxide. Conditions for operating the absorption unit will depend upon the particular absorbent and may be readily determined by those skilled in the art. The product gas, i. e., the carbon monoxide and hydrogen, is removed from absorption unit via line 39. The carbon dioxide-rich absorbent is removed via line 40 and is passed through heat exchanger 41 to desorption unit 42. In this unit the carbon dioxide is removed by such means as pressure reduction or heating and is removed therefrom via line 28. The lean absorbent is removed via line 43 and is passed through heat exchanger 41 back to absorption unit 38.

It is within the scope of my invention to pass a portion of the hydrogen recovered from absorber 21 through line 22 via line 35 to line 39. In this manner the mixture of gas passed to shift converter 31 contains less hydrogen, and because the reaction goes to a certain equilibrium more hydrogen will be made than would have been made if all of the hydrogen from the adsorber 21 had been passed thereto. In this manner, there is a greater quantity of hydrogen provided and therefore the hydrogen to carbon monoxide ratio is increased.

Refer now to Figure 2. Tangential burner residue gas is passed via line 60 to preheater 61 from which it is passed along with steam introduced via line 63 to shift converter 62. In this converter most of the carbon monoxide present is changed to carbon dioxide and hydrogen over a suitable catalyst. The shifted gas containing hydrogen, carbon dioxide, a trace of carbon monoxide, steam and nitrogen is passed via line 64 to cooler 66. The cooled products of the shift converter are passed via line 68 to condenser 65 where the steam is condensed and removed therefrom as water via line 17. The remaining uncondensed material is passed from condenser 65 via line 75 to dryer 69 which may contain bauxite or other suitable drying material, and the residual moisture removed therefrom. The dried gases are passed via line 70 to moving bed charcoal adsorption unit 71 by means of which the hydrogen is removed from the heavier gases. Selection of suitable conditions for operating this unit is well within the skill of the art. The hydrogen is passed via line 72 back through cooler 66 in which it cools the shifted gases by indirect heat exchange. The heavy gases, i. e., carbon dioxide, carbon monoxide, and nitrogen are removed from adsorption unit 71 via line 73 and are passed therethrough to absorption unit 74. In unit 74 a suitable carbon dioxide absorption medium introduced via line 76 is contacted with the gas flowing therethrough and absorbs the carbon dioxide leaving nitrogen and the trace of carbon monoxide. The off gas comprising nitrogen and carbon monoxide is removed from unit 74 by means of line 77. The absorption material carrying carbon dioxide is passed via line 78 through heat exchange 79 to desorption unit 80 where the carbon dioxide is removed from the absorbent. The regenerated absorption material now lean in carbon dioxide is passed back to absorption unit 74 via line 76. The thus obtained relatively pure carbon dioxide is passed via line 81 to line 82 where it is admixed with hydrogen from cooler 66 introduced via line 83 and/or fresh carbon dioxide introduced via line 82. This admixture is passed to a reverse shift converter 84 which shifts a portion of the carbon dioxide, by reaction with hydrogen, to carbon monoxide and water. The product from this reaction is passed via line 86 to condenser 87 where water is removed via line 88. The gas is passed via line 89 to a second absorption unit 90 where the unconverted carbon dioxide is removed. The lean absorption medium is introduced to this unit via line 91 and the carbon dioxide-rich material is withdrawn, via line 92. Product carbon monoxide and hydrogen synthesis gas is recovered via line 93.

It is also feasible in this embodiment of my invention to pass a portion of the hydrogen removed from adsorber 71 through line 72 and pass same via line 85 to line 93 where it is admixed with the product carbon monoxide and hydrogen to increase the proportion of hydrogen to carbon monoxide in a manner similar to that discussed in conjunction with Figure 1.

Advantages of my invention are illustrated by the following example. The reactants and their proportions, and other specific materials are presented as being typical and should not be construed to limit the invention unduly.

*Example*

A tangential burner residue gas and steam in a mol ratio of steam to dry residue gas of 152/100 is passed to a first shift converter. The composition of this feed gas in mol per cent is 0.1% $CO_2$, 2.5% $CO$, 6.6% $H_2$, 30.8% $N_2$ and 60.0% steam. This gas is shifted over an iron oxide catalyst at a temperature of 800° F. and a contact time of 4 seconds. The composition of the shifted gas in mol per cent is 2.51% $CO_2$, 0.04% $CO$, 9.11% $H_2$, 30.55% $N_2$, and 57.79% steam. This gas is passed through a condenser which removes most of the water and then through a dryer which removes residual vapor. The dry gas which is the feed for an adsorption unit has the following composition, given in mol per cent: 5.95% $CO_2$, 0.10% $CO$, 21.60% $H_2$, and 72.35% $N_2$. An overhead fraction is obtained containing mostly hydrogen and is of the following composition: 95.3% $H_2$, 0.1% $CO_2$, and 4.6% $N_2$. A middle fraction is also taken off the adsorption column comprising 99.8% nitrogen and 0.2% $CO$. The bottoms fraction comprises substantially pure carbon dioxide.

A gas mixture comprising the overhead and bottoms fractions from the adsorption unit and recycle and added carbon dioxide of the following composition: 58.4% $CO_2$, 39.7% $H_2$, and 1.9% $N_2$, is fed to a reverse shift converter where a portion of the carbon dioxide and hydrogen are converted to carbon monoxide and water. The shift reaction is carried out at a temperature of 900° F. and at a contact time of 4 seconds over an iron oxide catalyst like that used in the first shift converter. The product of the shift reaction comprises 44.2% $CO_2$, 14.2% $CO$, 25.5% $H_2$, 1.9% $N_2$, and 14.2% steam. This gas is passed through a condenser for the removal of water and an amine absorption unit for the removal of carbon dioxide. The final product then consists of 34.1% $CO$, 61.3% $H_2$, and 4.6% $N_2$. The ratio of $CO/H_2$ in this is 1:1.8 which is within the desired range for use as feed stock for Fischer-Tropsch synthesis and the like.

Obviously if other proportions of carbon monoxide and hydrogen were desired, it would be possible to obtain them by controlling the proportion of carbon dioxide to hydrogen. Therefore, my invention is not to be limited by the specific data given in the above example.

By operating my process as above described a normally wasted gas is converted into desirable materials for feed to Fischer-Tropsch synthesis and like processes requiring a carbon monoxide-hydrogen feed. Recoverable also is nitrogen of sufficient purity that it may be used for ammonia synthesis or other processes.

Although this process has been described and exemplified in terms of its preferred modifications, it is understood that various changes may be made without departing from the spirit and scope of the disclosure and of the claims.

I claim:

1. A process for the recovery of carbon monoxide and hydrogen from high nitrogen content gases containing same which comprises shifting such a high nitrogen content gas by means of the water gas shift reaction in such a manner that substantially all of the carbon monoxide is converted to carbon dioxide, separating product of said shift reaction into a hydrogen fraction, a carbon dioxide fraction, and a nitrogen fraction by sorption means, admixing said hydrogen and carbon dioxide, shifting said admixture by means of a reverse of the water gas shift reaction and thereby converting at least a portion of said carbon dioxide to carbon monoxide, removing unconverted carbon dioxide and recovering a mixture of hydrogen and carbon monoxide as a product of the process.

2. A process for the recovery of carbon monoxide and hydrogen from high nitrogen content gases containing same which comprises heating such a high nitrogen content gas and catalytically shifting same in the presence of steam by the water gas shift reaction thereby converting the carbon monoxide present to carbon dioxide, separating product of said shift reaction into a hydrogen fraction, a carbon dioxide fraction, and a nitrogen fraction by sorption means, heating said hydrogen and carbon dioxide together and catalytically shifting same by a reverse of the water gas shift reaction so that at least a portion of said carbon dioxide is converted to carbon monoxide, passing products from said shift reaction through an absorption zone wherein any remaining carbon dioxide is removed, and recovering a mixture of carbon monoxide and hydrogen as a product of the process.

3. A process according to claim 2 wherein said nitrogen is recovered as a by-product of the process.

4. A process according to claim 2 wherein said carbon dioxide is removed from said carbon monoxide and hydrogen by amine absorption.

5. A process according to claim 2 wherein said sorption is adsorption.

6. A process according to claim 2 wherein the shift catalyst is iron oxide.

7. A process for the recovery of carbon monoxide and hydrogen from high nitrogen content gases containing same which comprises shifting such a high nitrogen content gas by means of the water gas shift reaction and thereby converting the carbon monoxide present to carbon dioxide, passing the product of this shift reaction to a moving bed adsorption zone wherein the gas is separated into hydrogen, nitrogen, and carbon dioxide, admixing said separated hydrogen and carbon dioxide and additional carbon dioxide, shifting said admixture by means of a reverse of the water gas shift reaction in such a manner that at least a portion of the carbon dioxide is converted to carbon monoxide, passing the product of said shift reaction through an absorption zone wherein the unconverted carbon dioxide is removed, and recovering remaining carbon monoxide and hydrogen as a product of the process.

8. A process for the recovery of carbon monoxide and hydrogen from tangential burner residue gas which comprises heating such a residue gas and introducing same along with steam to a shift converter, catalytically shifting the carbon monoxide content of said gas to carbon dioxide at a temperature of 800° F. and a contact time of 4 seconds, cooling the product of said shift reaction and thereby causing water to condense out, passing the shift product through a drying zone to remove remaining water vapor, separating the remainder of the shift product by adsorption into primarily hydrogen, nitrogen, and carbon dioxide, admixing said hydrogen and carbon dioxide and additional carbon dioxide, heating this admixture and catalytically shifting same at a temperature of 900° F. and a contact time of 4 seconds by means of a reverse of the water gas shift reaction and thereby causing at least a portion of the carbon dioxide to form carbon monoxide, cooling this shifted material and condensing water therefrom, passing the gas from said cooling to amine absorption whereby remaining carbon dioxide is removed leaving a product gas consisting of carbon monoxide and hydrogen.

9. A process for the recovery of carbon monoxide and hydrogen from high nitrogen content gases containing same which comprises shifting such a high nitrogen content gas by means of the water gas shift reaction and thereby converting the carbon monoxide present to carbon dioxide, passing the product of this shift reaction to a moving bed adsorption zone wherein the gas is separated into a hydrogen fraction and a nitrogen-carbon dioxide fraction, passing said nitrogen-carbon dioxide fraction to a carbon dioxide absorption zone where the carbon dioxide is removed, admixing thus removed carbon dioxide with said hydrogen fraction from said adsorption zone, shifting said admixture by means of a reverse of the water gas shift reaction in such a manner that at least a portion of the carbon dioxide is converted to carbon monoxide, passing the product of said reverse shift reaction through an absorption zone wherein the unconverted carbon dioxide is removed, and recovering remaining carbon monoxide and hydrogen as a product of the process.

10. A process for the recovery of carbon monoxide and hydrogen from tangential burner residue gas which comprises heating such a residue gas and introducing same along with steam to a shift converter, catalytically shifting the carbon monoxide content of said gas to carbon dioxide at a temperature of 800° F. and a contact time of 4 seconds, cooling the product of said shift reaction and thereby causing water to condense out, passing the shift product through a drying zone to remove remaining water vapor, separating the remainder of the shift product by adsorption into a hydrogen fraction and a nitrogen-carbon dioxide fraction, passing said nitrogen-carbon dioxide fraction to amine absorption whereby the carbon dioxide is separated from the nitrogen, desorbing said carbon dioxide and admixing same with said hydrogen fraction and additional carbon dioxide, heating this admixture and catalytically shifting same at a temperature of 900° F. and a contact time of 4 seconds by means of a reverse of the water gas shift reaction and thereby causing at least a portion of the carbon dioxide to form carbon monoxide, cooling this shifted material and condensing water therefrom, passing the gas from said cooling to amine absorption whereby remaining carbon dioxide is removed leaving a product gas consisting of carbon monoxide and hydrogen.

11. A process for the recovery of carbon monoxide and hydrogen from high nitrogen content gases containing same which comprises shifting such a high nitrogen content gas by means of the water gas shift reaction and thereby converting the carbon monoxide present to carbon dioxide, passing the product of this shift reaction to a moving bed adsorption zone wherein the gas is separated into a hydrogen fraction and a nitrogen-carbon dioxide fraction, passing said nitrogen-carbon fraction to a carbon dioxide absorption zone, absorbing said carbon dioxide in a suitable absorbent, passing said absorbent to a desorbing zone wherein said carbon dioxide is removed therefrom, recycling desorbed absorbent to said absorption zone, admixing thus separated carbon dioxide with said hydrogen fraction from said adsorption zone and additional carbon dioxide, shifting said admixture by means of a reverse of the water gas shift reaction in such a manner that at least a portion of the carbon dioxide is converted to carbon monoxide, passing the product of said shift reaction through a second absorption zone, absorbing the unconverted carbon dioxide from the shifted gas, passing the absorbent to the above described desorption zone wherein said unconverted carbon dioxide is removed therefrom, recycling desorbed adsorbent to said second absorption zone, and recovering remaining carbon monoxide and hydrogen as a product of the process.

PARKIN T. SOWDEN, Jr.

No references cited.